US012134268B2

(12) United States Patent
Jun et al.

(10) Patent No.: US 12,134,268 B2
(45) Date of Patent: Nov. 5, 2024

(54) INKJET PRINTING APPARATUS INCLUDING PRINTING UNIT AND MAINTENANCE UNIT AND PRINTING METHOD USING THE SAME

(71) Applicant: SEMES CO., LTD., Cheonan-si (KR)

(72) Inventors: Dong Hyun Jun, Seongnam-si (KR); Woon Sang Baek, Seoul (KR); Sang Hyuk Yun, Hwaseong-si (KR); Keun Hwa Yang, Hwaseong-si (KR); Hyung Suk Lee, Yongin-si (KR); Cheol Hyung Cho, Hwaseong-si (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 73 days.

(21) Appl. No.: 17/868,080

(22) Filed: Jul. 19, 2022

(65) Prior Publication Data

US 2023/0035323 A1 Feb. 2, 2023

(30) Foreign Application Priority Data

Jul. 21, 2021 (KR) ........................ 10-2021-0095579

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC .. B41J 2/0451; B41J 2/04586; B41J 2/16517; B41J 2/16579; B41J 2/2142; B41J 29/393
See application file for complete search history.

(56) References Cited

U.S. PATENT DOCUMENTS

2015/0241317 A1* 8/2015 Miyoshi ................. H10K 71/00
427/8

FOREIGN PATENT DOCUMENTS

| | | | |
|---|---|---|---|
| JP | 2008-209439 | A | 9/2008 |
| JP | 2015-160153 | A | 9/2015 |
| KR | 102170962 | B1 | 10/2020 |
| KR | 10-2020-0136501 | A | 12/2020 |

OTHER PUBLICATIONS

Japanese Office Action dated Jun. 6, 2023 issued in corresponding Japanese Appln. No. 2022-113380.

* cited by examiner

*Primary Examiner* — Bradley W Thies
(74) *Attorney, Agent, or Firm* — Harness, Dickey & Pierce, P.L.C.

(57) ABSTRACT

The inventive concept provides an inkjet printing method. The inkjet printing method for discharging an ink on a substrate using a head having a plurality of nozzles formed thereon includes determining a grade of nozzles by measuring a discharge performance of the nozzles, which is a grading step; selecting a use nozzle that can participate in printing the substrate among the nozzles based on the grade determined at the grading step, which is a nozzle selecting step; and discharging the ink on the substrate using at least one nozzle among use nozzles, which is a printing step.

3 Claims, 5 Drawing Sheets

INKJET PRINTING APPARATUS INCLUDING PRINTING UNIT AND MAINTENANCE UNIT AND PRINTING METHOD USING THE SAME

CROSS-REFERENCE TO RELATED APPLICATIONS

A claim for priority under 35 U.S.C. § 119 is made to Korean Patent Application No. 10-2021-0095579 filed on Jul. 21, 2021, in the Korean Intellectual Property Office, the entire contents of which are hereby incorporated by reference.

TECHNICAL FIELD

Embodiments of the inventive concept described herein relate to an inkjet printing method and an inkjet printing apparatus.

BACKGROUND

Recently, there has been a need to manufacture display devices such as a liquid crystal display device having a high resolution and an organic EL display device. In order to manufacture a display device having a high resolution, more pixels per unit area should be formed on a substrate such as a glass, and it is important to discharge an ink droplet on each of the densely arranged pixels at an accurate position. However, there is a deviation in a discharge performance between nozzles of a head discharging the ink droplet. Such a deviation in the discharge performance makes it difficult to accurately control an impact position of the ink droplet discharged from the nozzle.

In addition, if a plurality of ink droplets are discharged from a nozzle with a low discharge performance (e.g., a target position, which is a target point at which the nozzle aims to discharge to, and an actual impact position of an ink droplet are significantly different), the plurality of ink droplets discharged on a substrate are located far from a target position. This reduces a quality of the display device.

SUMMARY

Embodiments of the inventive concept provide an inkjet printing method and an inkjet printing apparatus capable of efficiently performing a printing process on a substrate.

Embodiments of the inventive concept provide an inkjet printing method and an inkjet printing apparatus capable of appropriately discharging an ink in a droplet form at a desired position.

Embodiments of the inventive concept provide an inkjet printing method and an inkjet printing apparatus capable of improving a discharge quality of an ink while preventing an increase in a time for performing a printing process on a substrate.

The technical objectives of the inventive concept are not limited to the above-mentioned ones, and the other unmentioned technical objects will become apparent to those skilled in the art from the following description.

The inventive concept provides an inkjet printing method for discharging an ink on a substrate using a head having a plurality of nozzles formed thereon. The inkjet printing method includes determining a grade of nozzles by measuring a discharge performance of the nozzles, which is a grading step; selecting a use nozzle that can participate in printing the substrate among the nozzles based on the grade determined at the grading step, which is a nozzle selecting step; and discharging the ink on the substrate using at least one nozzle among use nozzles, which is a printing step.

In an embodiment, at the printing step a nozzle having a high grade determined at the grading step among the use nozzles is made to preferentially participate in a printing.

In an embodiment, at the nozzle selecting step, a non-use nozzle to be excluded from printing the substrate is selected among the nozzles, and remaining nozzles are selected as use nozzles based on the grade determined at the grading step.

In an embodiment, for a selection of the non-use nozzle at the nozzle selecting step, a nozzle which has a grade lower than a reference grade is selected as the non-use nozzle.

In an embodiment, the printing step is performed a plurality of times, and the grading step and the nozzle selecting step is performed between printing steps.

In an embodiment, the grading step and the nozzle selecting step is performed a plurality of times.

In an embodiment, at the nozzle selecting step, a nozzle selected as the non-use nozzle converts to the use nozzle if a set condition is satisfied.

In an embodiment, the set condition is that a recovery probability that the non-use nozzle will perform a printing on the substrate with a quality of the reference grade or higher is equal to or greater than a set probability, if the non-use nozzle participates in the printing step.

In an embodiment, the recovery probability is derived by comparing a pre-acquired reference data and a grade data of a nozzle selected as the non-use nozzle, and the grade data is a data on grades determined for a nozzle selected as the non-use nozzle by performing the grading step a plurality of times.

In an embodiment, the grading step further includes a test discharge step at which each of the nozzles discharge the ink on a test member at least once; and an extraction step for extracting a feature data of each of the nozzles based on an impact point of an ink discharged on the test member.

In an embodiment, the extraction step is performed a plurality of times, and the extraction step further comprises a normalization step for normalizing the feature data extracted in the extraction step.

In an embodiment, the grading step further includes a grade determination step for determining the grade of the nozzles, and derives an evaluation data for evaluating a grade of each nozzle based on a normalized feature data, and the grade of the nozzles are determined based on a section in which a change rate of a derived evaluation data exceeds a set value.

The inventive concept provides an inkjet printing apparatus. The inkjet printing apparatus includes a printing unit for performing a printing by discharging an ink on a substrate; a maintenance unit positioned alongside the printing unit; a head configured to be movable between the printing unit and the maintenance unit and having a plurality of nozzles formed thereon; a measurement unit positioned at the maintenance unit and measuring a discharge performance of nozzles; and a controller being transmitted with a measured data measured by the measurement unit and controlling the head based on the measured data, and wherein the controller determines the discharge performance of the nozzles based on the measured data, determines a grade of the nozzles, selects use nozzles which can participate in a substrate printing at the printing unit based on the grade, and generates a control signal so the head may discharge the ink on the substrate using at least one nozzle among the use nozzles.

In an embodiment, the controller generates a control signal to preferentially participate a nozzle having a high grade among the use nozzles in printing the substrate.

In an embodiment, the controller selects a non-use nozzle to be excluded from printing the substrate among the nozzles based on the grade, and remaining nozzles are selected as the use nozzles.

In an embodiment, the controller selects a nozzle having a grade lower than a reference grade as the non-use nozzle, and converts a nozzle having a recovery probability, that is, a probability that the substrate will be printed with a quality equal to or greater than the reference grade if the nozzle selected as the non-use nozzle participates in printing the substrate, equal to or greater than a set probability based on a pre-stored reference data among a nozzle selected as the non-use nozzle.

In an embodiment, the reference data stored at the controller includes an information of the grades changing according to a number of discharge sessions of a discharge of the ink by the nozzles.

The inventive concept provides an inkjet printing method for discharging an ink on a substrate using a head having a plurality of nozzles formed thereon. The inkjet printing method includes determining a grade of nozzles by measuring a discharge performance of the nozzles, which is a grading step; selecting a use nozzle that can participate in printing the substrate among the nozzles based on the grade determined at the grading step, which is a nozzle selecting step; and discharging the ink on the substrate using at least one nozzle among use nozzles, which is a printing step, at which a nozzle having a high grade determined at the grading step among the use nozzles is made to preferentially participate in a printing.

In an embodiment, the grading step, the nozzle selecting step, and the printing step is performed a plurality of times, and a grade of each of the nozzles are re-evaluated each time the grading step is performed.

In an embodiment, the grading step, the nozzle selecting step, and the printing step are performed a plurality of times, and a selecting of the use nozzle is performed each time the nozzle selecting step is performed.

According to an embodiment of the inventive concept, a printing process on a substrate may be efficiently performed.

According to an embodiment of the inventive concept, an ink in a droplet form may be appropriately discharged at a desired position.

According to an embodiment of the inventive concept, a discharge quality of an ink may be improved while an increase in a time for performing a printing process on a substrate may be prevented.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
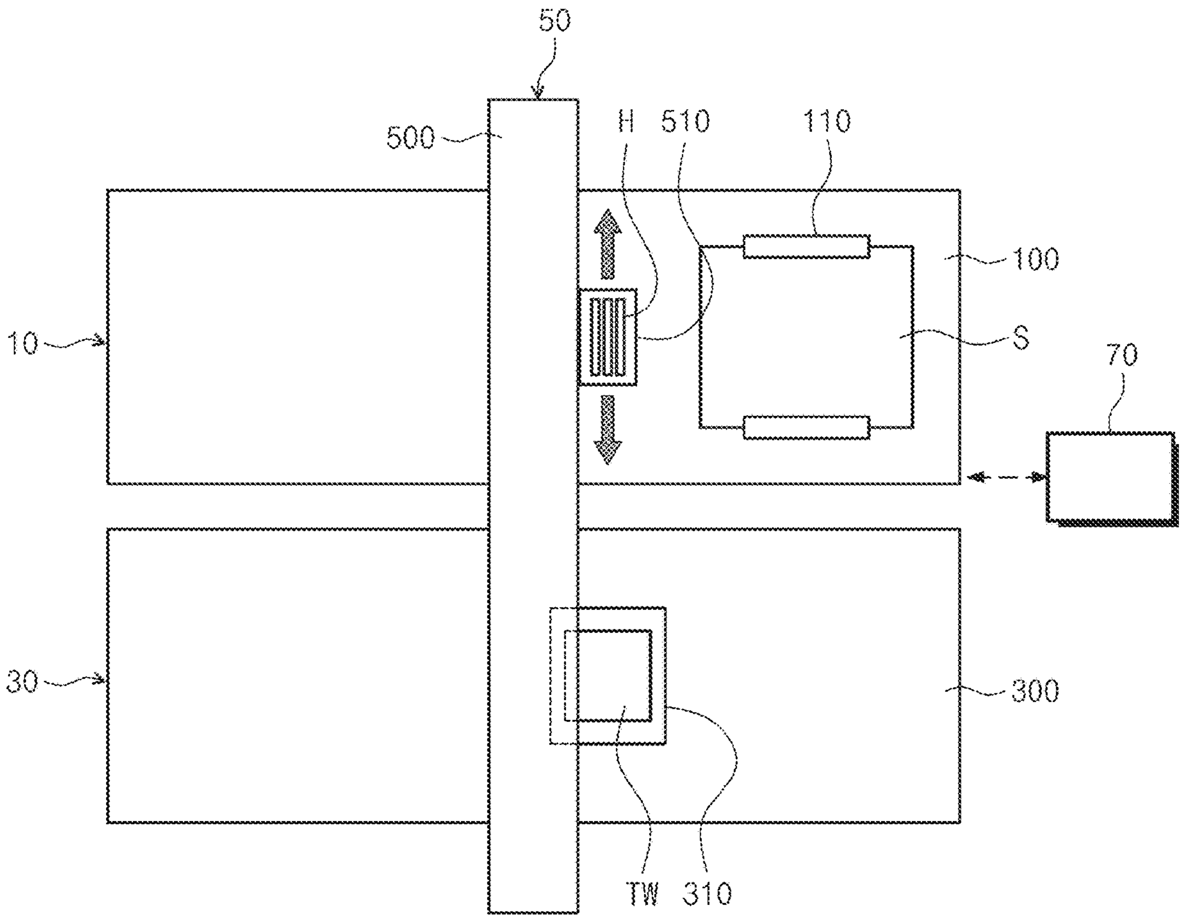
FIG. 1 illustrates a substrate treating apparatus according to an embodiment of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising,", "includes", and/or "including" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "example" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Other terms such as "between", "adjacent", "near" or the like should be interpreted in the same way.

Unless otherwise defined, all terms used herein, including technical or scientific terms, have the same meaning as those generally understood by those skilled in the art to which the inventive concept belongs. Terms such as those defined in commonly used dictionaries should be interpreted as consistent with the context of the relevant technology and not as ideal or excessively formal unless clearly defined in this application.

Hereinafter, an embodiment of the inventive concept will be described with reference to FIG. 1 to FIG. 8.

FIG. 1 illustrates a substrate treating apparatus according to an embodiment of the inventive concept.

Referring to FIG. 1, the substrate treating apparatus in accordance with an embodiment of the inventive concept may be an inkjet printing apparatus that treats a substrate by supplying an ink in a droplet form on the substrate S. The substrate S may be a glass. The substrate S may be a glass substrate for manufacturing a display device. However, a type of the substrate S is not limited thereto, and may be variously modified into a known object to be treated which requires a supply of a droplet type ink.

The inkjet printing apparatus may include a printing unit 10, a maintenance unit 30, an ink supply unit 50, and a controller 70.

The printing unit 10 may perform a printing process on the substrate S. In the printing unit 10, the ink supply unit 50 to be described later may be an area for performing a printing process by supplying inks in a droplet form to a top surface of the substrate S. The printing unit 10 may include a printing stage 100 and a moving member 110. The printing stage 100 may define an area in which the substrate S is treated. In addition, the printing stage 100 may be provided with an air supply pipe (not shown) that supplies an air to a bottom surface of the substrate S to float the substrate S, and an air exhaust pipe (not shown) that sucks some of the air supplied by the air supply pipe. The printing stage 100 may function as a floating stage for floating the substrate S.

The substrate S floated by the air supplied at the printing stage 100 may be gripped by the moving member 110. The moving member 110 may grip a side and/or another side of the substrate S. The moving member 110 may grip a side and/or another side of the substrate S in a vacuum adsorption manner. The moving member 110 may move the substrate S along a direction in which the printing stage 100 extends. The moving member 110 may be referred to as a gripper.

When viewed from above, the maintenance unit 30 may be disposed alongside the printing unit 10. The maintenance unit 30 may perform a maintenance on the head unit 510 of the ink supply unit 50 to be described later. In addition, the maintenance unit 30 may measure a state of the head unit 510. In addition, in the maintenance unit 30, a test discharge of a head H included in the head unit 510 may be performed to measure a discharge performance of the nozzles N.

Since the head unit 510 may discharge an ink for correcting an impact position of an ink discharged, adjusting a volume of the ink, controlling an ink discharge amount, and the like, the maintenance unit 30 may have a same or a similar process environment as the printing unit 10.

The maintenance unit 30 may include a maintenance stage 300 and a measurement unit 310. The maintenance stage 300 may have a same or a similar structure as the printing stage 100 described above, and although not shown, the maintenance stage 300 may also be provided with a moving member having a same or a similar structure as the moving member 110.

In addition, the measurement unit 310 may be disposed in the maintenance unit 30. The measurement unit 310 may be disposed to measure a discharge performance of nozzles N to be described later. The discharge performance of the nozzle N to be measured by the measurement unit 310 may be, for example, an accuracy of an impact position of the ink discharged from the nozzles N. The accuracy of the impact position increases as a distance from a target position of the ink discharged from each nozzle N decreases. The measurement unit 310 may be a JOF unit capable of supplying a test member TW, for example, a test film. The measurement unit 310 may supply the test member TW by winding or rolling the test member TW in a roller manner. In addition, the measurement unit 310 may include an image acquisition member such as a camera to acquire an image I related to the ink discharged to the test member TW and a light source. A measurement data acquired and measured by the measurement unit 310 (e.g., an image I related to the ink discharged to the test member TW) may be transmitted to the controller 70 to be described later.

The ink supply unit 50 may discharge an ink onto the substrate S. The ink supply unit 50 may include a gantry 500 and a head unit 510. The gantry 500 may be installed to cross the printing stage 100 and the maintenance stage 300 when viewed from above. The gantry 500 may provide a moving path through which the head unit 510 may move back and forth between the printing stage 100 of the printing unit 10 and the maintenance stage 300 of the maintenance unit 30. That is, the head unit 510 may be configured to be movable between the printing unit 10 and the maintenance unit 30.

Figure 2:
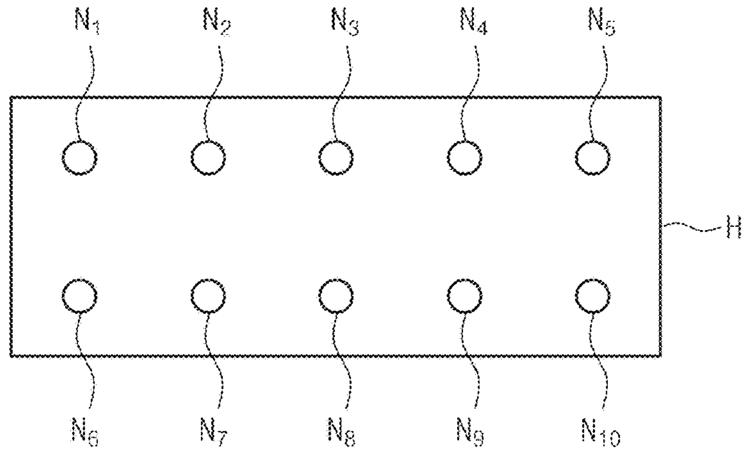
FIG. 2 illustrates an embodiment of a nozzle formed on a head of FIG. 1.

The head unit 510 may include a plurality of heads H, and a plurality of nozzles N may be formed in each of the heads H, as illustrated in FIG. 2. Although FIG. 2 illustrates that there are a total of 10 nozzles N from the first nozzle $N_1$ to the tenth nozzle $N_{10}$, the inventive concept is not limited thereto, and the number of nozzles N formed in each head H may be variously modified as necessary. For example, the head unit 510 may have about 30,000 nozzles N per color R, G, and B, and a total of about 90,000 nozzles N.

Referring back to FIG. 1, the controller 70 may control the substrate treating apparatus. The controller 70 may generate a control signal so that the substrate treating apparatus may perform an inkjet printing method to be described later. The controller 70 may receive a measurement data measured by the measurement unit 310 and generate a control signal for controlling the head H of the head unit 510 based on the measurement data.

The controller 70 may also consist of one or more processors that perform a controlling of the substrate treating apparatus, and a computer program stored in a computer-readable medium, including instructions for such processors to perform operations to control the substrate treating apparatus. In addition, the controller 70 may include a user interface including a keyboard for performing a command input operation or the like to manage the substrate treating apparatus by an operator, or a display for visually displaying an operation state of the substrate treating apparatus. In addition, the user interface and a storage unit may be connected to the processor.

Figure 3:
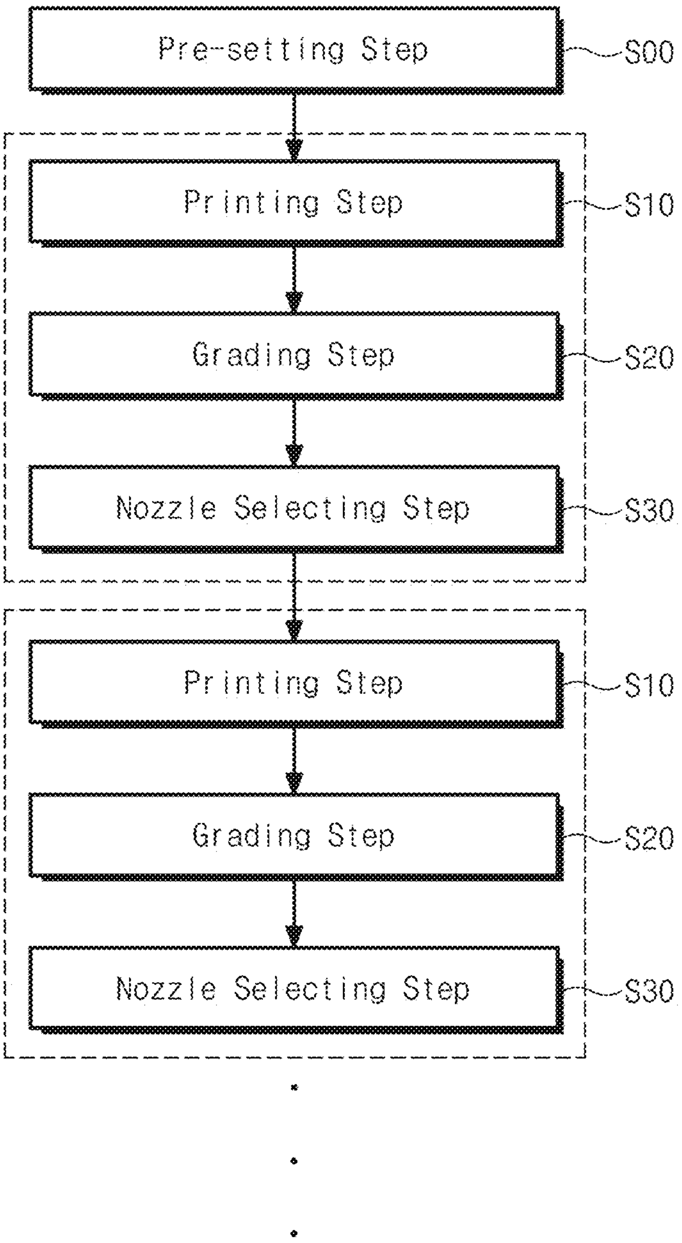
FIG. 3 is a flowchart illustrating an inkjet printing method according to an embodiment of the inventive concept.

FIG. 3 is a flowchart illustrating an inkjet printing method according to an embodiment of the inventive concept. Referring to FIG. 3, the inkjet printing method according to an embodiment of the inventive concept may include a pre-setting step S00, a printing step S10, a grading step S20, and a nozzle selecting step S30. And, the printing step S10, the grading step S20, and the nozzle setting step S30 may be repeatedly performed based on the number of substrates S requiring a treatment.

In the pre-setting step S00, a set value for controlling the head unit 510 in the first printing step S10 of the head unit 510 may be input. In the pre-setting step S00, the head unit 510 may perform a plurality of test discharges of the nozzles N to correct an ink discharge timing, an ink volume, and an ink impact position of the nozzle N, may measure a discharge performance for each nozzle N in advance, and input the grade for each nozzle N to the controller 70.

For example, the grades for each of the nozzles N input in the pre-setting step S00 may be as follows.

TABLE 1

| Nozzle Number | Grade |
|---|---|
| 1 | C |
| 2 | A |
| 3 | B |
| 4 | C |
| 5 | B |
| 6 | A |
| 7 | A |
| 8 | A |
| 9 | B |
| 10 | B |

Hereinafter, a high grade of the nozzle N may mean that the impact position of the ink discharged from the nozzle N is more accurate. In addition, the high grade of the nozzle N may mean that when the ink is discharged from the nozzle N a plurality of times, the impact positions of the ink are relatively more gathered at the target position. In addition, the high grade of the nozzle N may mean that a grade of the nozzle N is closer to grade A among grades A, B, and C. The above classification described as A, B, and C is merely an example and may be modified in various ways capable of expressing a discharge performance of the nozzle N. In addition, in the pre-setting step S00, a use nozzle capable of participating in a printing of the substrate S and a non-use nozzle uncapable of participating in the printing of the substrate S may be sorted based on a grade of a previously input nozzle N.

For example, the non-use nozzle may be selected as nozzles N having a grade lower than a preset reference grade. For example, when the reference grade is a Grade B, nozzles N of a grade C lower than the Grade B may be excluded from printing the substrate S. For example, the first nozzle N1 and the fourth nozzle N4 of Table 1 may be selected as non-use nozzles. In addition, the second nozzle N2, the third nozzle N3, and the fifth nozzle N5 to the tenth nozzle N10 may be selected as a use nozzle.

When the pre-setting step S00 is completed, the head unit 510 may perform a first printing step S10. In the printing step S10, the head unit 510 may discharge an ink to the substrate S. In the printing step S10, nozzles N selected as use nozzles among the nozzles N of the head unit 510 may participate in a printing operation for the substrate S.

In addition, the number of nozzles N participating in the printing operation may vary according to a process time set by a user at the controller 70. For example, if the user wants to complete the printing step S10 on the substrate S for a relatively short time, the number of nozzles N participating in the printing operation may be increased, and if the user wants to perform the printing step S10 on the substrate S for a relatively long time, the number of nozzles N participating in the printing operation may be decreased. That is, the number of nozzles N participating in the printing operation may vary according to the user's setting.

When the number of nozzles N sorted as use nozzles is greater than the number of nozzles N actually participating in the printing operation, the controller 70 may first select a high-grade nozzle N among the use nozzles to participate in printing the substrate S. For example, when the number of nozzles N participating in the actual printing operation is four, the nozzles N participating in the printing step S10 in Table 1 may be a second nozzle N2, a sixth nozzle N6, a seventh nozzle N7, and an eighth nozzle N8. Accordingly, a printing quality for the substrate S may be further improved. In addition, one printing step S10 may not perform a printing operation on a plurality of substrates S, but may perform a printing operation on a single substrate S.

When an execution of the printing step S10 is completed, a grading step S20 may be performed. In the grading step S20, the head unit 510 may move to above the measurement unit 310 to measure a discharge performance of the nozzles N, and then determine the grades of the nozzles N again.

For example, in the grading step S20, the grades of the nozzles N input in the pre-setting step S00 may be updated. The grades of the updated nozzles N may be as follows.

TABLE 2

| Nozzle Number | Grade |
|---|---|
| 1 | C |
| 2 | A |
| 3 | C |
| 4 | B |
| 5 | B |
| 6 | A |
| 7 | A |
| 8 | A |
| 9 | B |
| 10 | A |

Figure 4:
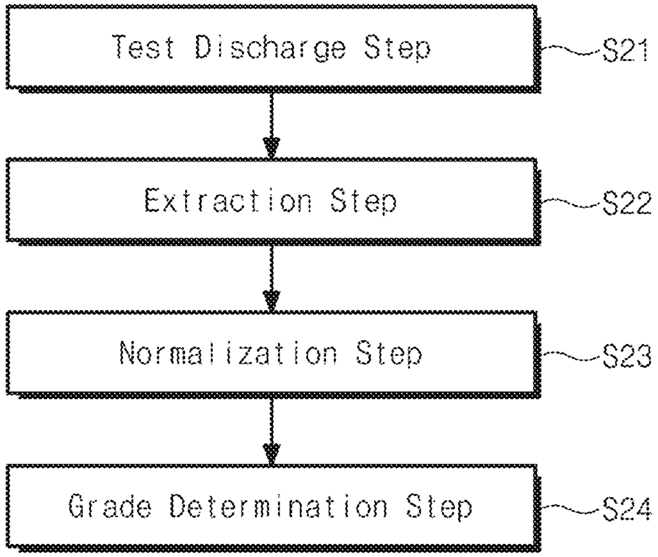
FIG. 4 is a detailed flowchart of the grading step of FIG. 3.

Hereinafter, the grading step S20 will be described in more detail. FIG. 4 is a detailed flowchart of the grading step of FIG. 3. Referring to FIG. 4, the grading step S20 may include a test discharge step S21, an extraction step S22, a normalization step S23, and a grade determination step S24. The test discharge step S21, the extraction step S22, the normalization step S23, and the grade determination step S24 may be sequentially performed.

The test discharge step S21 can be a step where each of the nozzles (N, that is, all nozzles N) discharge an ink to the test member TW at least once. In the test discharge step S21, each nozzle N may discharge the ink to the test member a plurality of times (for example, five or more times).

When the nozzles N completely discharge the ink to the test member TW in the test discharge step S21, the measurement unit 310 may acquire an image I (an embodiment of a measurement data) of the test member TW, and may transmit the image to the controller 70.

In the extraction step S22, a feature data for each nozzle N may be extracted based on the impact position of the ink discharged on the test member TW.

Figure 5:
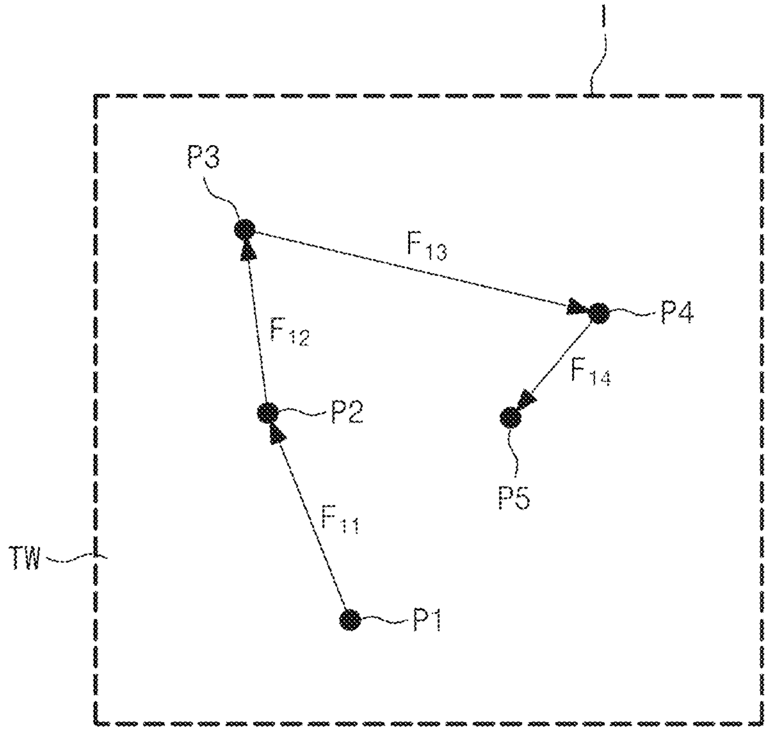
FIG. 5 illustrates an embodiment of a feature data extracted at an extraction step of FIG. 4.

In an embodiment, as illustrated in FIG. 5, in order to grade the nozzle N in consideration of a variability over time, five points P1 to P5 according to a number of discharge sessions of a discharge of the ink may be measured, and a distance from P1 to P2 Fl1, a distance from P2 to P3 F12, and a distance from P4 to P5 F14 may be calculated. Then, an F1 value (an embodiment of a feature data) obtained by summing all the values of F11 to F14 may be calculated. This process may be performed on each of the nozzles N.

In this case, since a nozzle N having a smaller F1 value with respect to each nozzle N has a relatively small size change of an impact position of an ink over time, it may be determined to be a nozzle N having a relatively high discharge performance.

Figure 6:
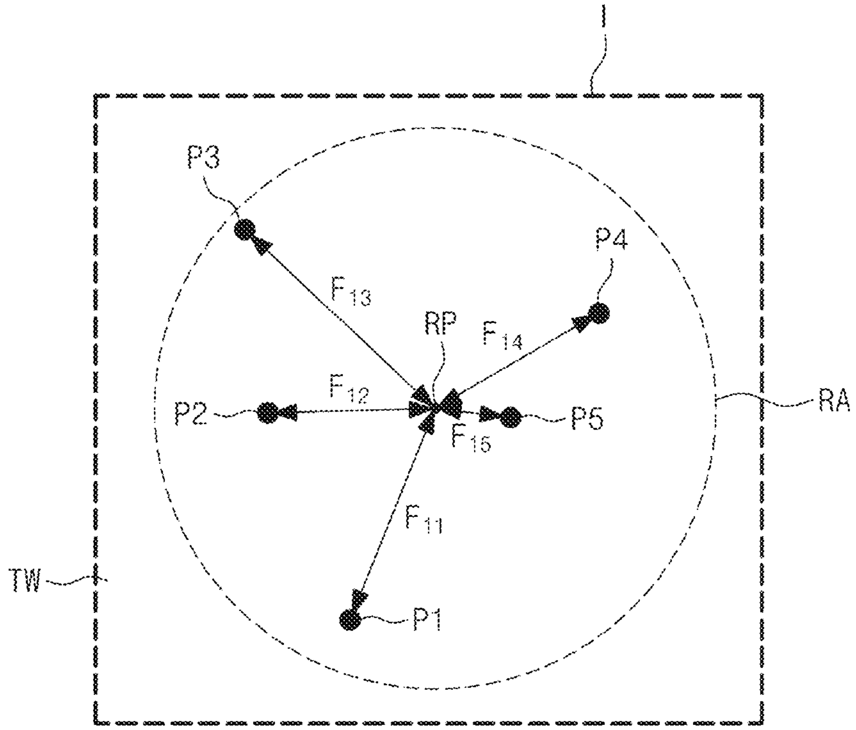
FIG. 6 illustrates another embodiment of the feature data extracted at the extraction step of FIG. 4.

As another embodiment, as illustrated in FIG. 6, to grade the nozzles N based on an impact position distribution of the ink, distances between five points P1 to P5 and a center point RP of a set region RA F11, F12, F13, F14, and F15 may be calculated and a largest value among those distances (an embodiment of a pitch data) may be extracted. This process may be performed on each of the nozzles N.

In this case, as an extracted distance for each nozzle N increases, since the impact positions of the ink are not relatively gathered, it may be determined to be a nozzle N having a relatively low discharge performance.

Figure 7:
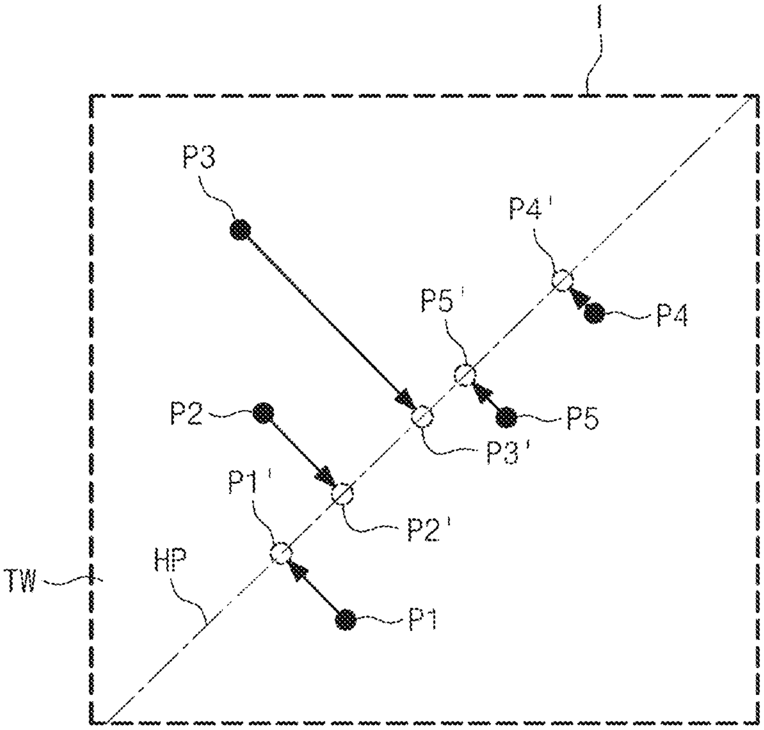
FIG. 7 illustrates another embodiment of the feature data extracted at the extraction step of FIG. 4.

As another embodiment, as shown in FIG. 7, the nozzle N may be graded using basic statistics. For example, as shown in FIG. 7, five points related to the impact position of the ink include all information on the X-axis and the Y-axis, that is, a multi-dimensional information. In this case, it is difficult to compare a quality between the nozzles N. For example, it is difficult to compare whether the impact positions are by a poor discharge performance of a nozzle N elongated in the X-axis direction or a poor discharge performance of a nozzle N elongated in the Y-axis direction.

Accordingly, a hyperplane (HP) may be derived using a principal component analysis (PCA) algorithm, and five points P1 to P5 may be projected onto the hyperplane. In this case, it is possible to derive a dispersion value (an embodiment of the feature data) to know how spread the projected five points P1' to P5' are.

In this case, as the dispersion value increases, since the impact position of the ink is relatively not gathered, it may be determined that the nozzle N has a relatively low discharge performance.

The feature data extracted at the extraction step S22 is merely an example, and various feature data that may be used to determine the grade of the nozzle N using a data (e.g., image I) regarding the ink discharged to the test member TW at the test discharge step S21.

As described above, the extraction step S22 may be performed a plurality of times. In this case, the levels of the feature data extracted in the extraction step S22 may be different from each other. In this case, some feature data may occupy an excessively large portion of determining the grade of the nozzle N, and others may occupy an excessively small portion of determining the grade of the nozzle N. Accordingly, according to an embodiment of the inventive concept, a normalization step S23 of normalizing an extracted feature data and matching levels between the feature data equally or similarly is performed.

After the normalization step S23, a grade determination step S24 of determining the grade of the nozzle N may be performed. In the grade determination step S24, the feature data on which the normalization step S23 is performed may be used in a statistical manner (e.g., a method such as an adding up, but is not limited thereto, and various statistical methods may be used) to derive an evaluation data value E for evaluating the grade of each nozzle.

Figure 8:
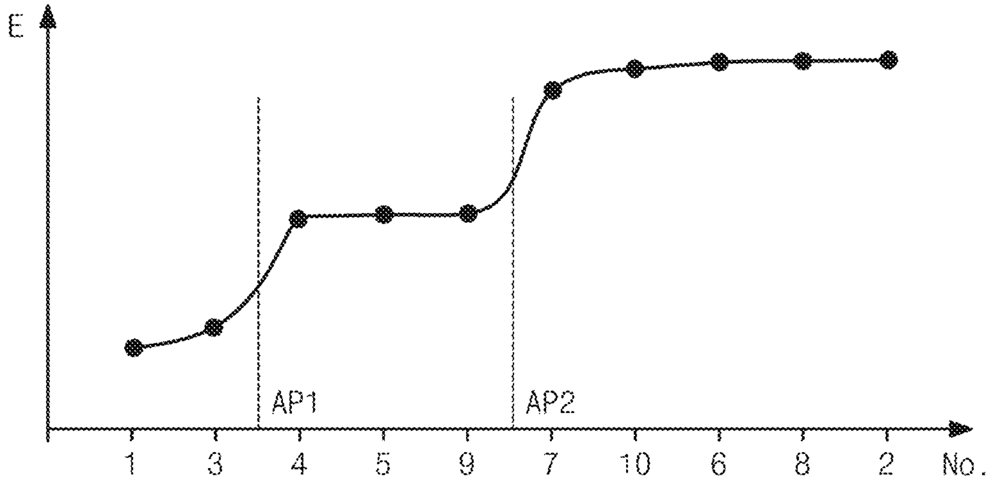
FIG. 8 is a graph for describing a method of determining a grade of nozzles at a grade determination step of FIG. 4.

In this case, when the grade of each nozzle N is determined based on the evaluation data value E, a generally adopted specific value, that is, a threshold value which sorts the grade of the nozzle N by specific ratios, is not set as a standard and as shown in FIG. 8, grades of the nozzle N may be sorted based on a section in which a change rate of the evaluation data E exceeds a preset value (that is, a section in which a size of the evaluation data E is relatively largely changed).

In this case, as shown in <Table 2>, the first nozzle N1 and the third nozzle N3 may be determined to be grade C, the fourth nozzle N4, the fifth nozzle N5, and the ninth nozzle N9 may be determined to be grade B, and the seventh nozzle N10, the sixth nozzle N6, and the eighth nozzle A8 may be determined to be grade A.

Referring back to FIG. 3, after the grading step S20 is performed, a nozzle selecting step S30 of selecting nozzles N to participate in the printing step S10 may be performed.

In the nozzle selecting step S30, a use nozzle capable of participating in printing the substrate S and a non-use nozzle excluded from printing the substrate S may be sorted based on the grade of the nozzle N updated in the grading step S20.

For example, the non-use nozzle may be selected as nozzles N having a grade lower than a preset reference grade. For example, when the reference grade is a grade B, nozzles N of a grade C lower than the grade B may be excluded from printing the substrate S. For example, the first nozzle N1 and the third nozzle N3 of Table 2 may be selected as non-use nozzles. In addition, the fourth nozzle N4, the fifth nozzle N5, the ninth nozzle N9, the seventh nozzle N7, the tenth nozzle N10, the sixth nozzle N6, the eighth nozzle N8, and the second nozzle N2 may be selected as use nozzles.

When the nozzle selecting step S30 is completed, the head unit 510 may perform a second printing step S10. In the second printing step S10, the head unit 510 may discharge an ink to the substrate S. In the printing step S10, nozzles N selected as use nozzles among the nozzles N of the head unit 510 may participate in a printing operation for the substrate S.

In addition, when the number of nozzles N sorted as use nozzles is greater than the number of nozzles N participating in the actual printing operation, the controller 70 may first select a high-grade nozzle N among the use nozzles to participate in printing the substrate S. For example, when the number of nozzles N participating in the actual printing operation is four, as nozzles N participating in the printing step S10 of Table 2, four nozzles may be selected among the seventh nozzle N7, the tenth nozzle N10, the sixth nozzle N6, the eighth nozzle N8, and the second nozzle N2 to perform a printing on the substrate.

That is, according to an embodiment of the inventive concept, when the printing process is completed for one substrate S, the grades of the nozzles N are updated, and the nozzles N having a high discharge performance based on the grades are preferentially discharged, thereby improving a treating efficiency with respect to the substrate S.

Meanwhile, as described above, the user may variously change treating conditions such as a process time, and in some cases, it may be necessary to reduce a time during which the printing step S10 is performed as much as possible. In other words, it is advantageous for the treating efficiency of the substrate S to have as many usable nozzles that can participate in printing the substrate S to be secured as much as possible in the printing step S10.

Therefore, according to an embodiment of this invention, if a nozzle selected as the non-use nozzle at the nozzle selecting step S30 satisfies a set condition, it is possible to switch to the use nozzle. Hereinafter, an example of converting a nozzle N selected as a non-use nozzle into a use nozzle will be described.

As described above, the grading step S20 may be performed a plurality of times. In this case, as shown in <Table 3> below, data on a grade change of each nozzle N determined in the grading step S20 may be accumulated.

TABLE 3

| Nozzle Number | First Measurement Grade | Second Measurement Grade | Third Measurement Grade | Fourth Measurement Grade |
|---|---|---|---|---|
| 1 | C | C | A | C |
| 2 | A | A | A | C |
| 3 | B | C | B | C |
| 5 | B | B | B | C |

Referring to <Table 3>, the first, second, third, fifth nozzles with a grade C (below the reference grade) measured in a fourth session of a grading step S20 are first selected as non-use nozzles. However, if all of the first, second, third, and fifth nozzles selected as non-use nozzles are sorted as non-use nozzles, the number of use nozzles that may actually participate in printing the substrate S may be relatively small and thus it may be disadvantageous for a process performance. However, in some cases, even if the first, second, third, and fifth nozzles are determined to be grade C (even for nozzles sorted as non-use nozzles), there is a probability (hereinafter, referred to as a recovery probability) of performing a printing at a quality higher than or equal to a reference grade (e.g., grade B) in the printing step S10. In the case of a nozzle having a recovery probability greater than or equal to a set probability, even if the nozzle is selected as a non-use nozzle by receiving a grade C in the grading step S20, the nozzle may be converted to a use nozzle.

The recovery probability may be confirmed through a previously obtained reference data. The reference data may be previously stored in the controller 70. Below is an embodiment of the reference data.

TABLE 4

| | | First Nozzle | Second Nozzle | Third Nozzle | Fifth Nozzle |
|---|---|---|---|---|---|
| Grade Information | First Session | C | A | B | B |
| | Second Session | C | A | C | B |
| | Third Session | A | A | B | B |
| Recovery Probability | | 0.4 | 0.9 | 0.5 | 0.7 |

When a determination is made based on the reference data of <Table 4>, and a set probability is 0.7, the nozzles switching from a non-use nozzle to a use nozzle in <Table 3> may be the second nozzle N2 and the fifth nozzle N5.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. An inkjet printing apparatus comprising:

a printing unit configured to perform a printing by discharging an ink on a substrate;

a maintenance unit being alongside the printing unit;

a head configured to be movable between the printing unit and the maintenance unit and having a plurality of nozzles thereon;

a measurement unit being at the maintenance unit and configured to measure a discharge performance of the nozzles; and a controller configured to receive measured data measured by the measurement unit and configured to control the head based on the measured data, and wherein the controller is configured to determine the discharge performance of the nozzles based on the measured data, select a nozzle having a grade lower than a reference grade among the nozzles as a non-use nozzle and remaining nozzles as use nozzles, convert a specific nozzle having a recovery probability equal to or greater than a set probability among the nozzle selected as the non-use nozzle to a use nozzle based on a pre-stored reference data, wherein the recovery probability is a probability that the substrate will be printed with a quality equal to or greater than the reference grade if the nozzle selected as the non-use nozzle participates in printing the substrate, and generate a control signal to cause the head to discharge the ink on the substrate using at least one nozzle among the use nozzles.

2. The inkjet printing apparatus of claim 1, wherein the controller is configured to generate the control signal to cause a specific nozzle having a high grade among the use nozzles to preferentially participate in printing the substrate.

3. The inkjet printing apparatus of claim 1, wherein the pre-stored reference data stored at the controller includes grade information changing according to a number of discharge sessions of a discharge of the ink by the nozzles.

* * * * *